Sept. 24, 1963  V. A. MADRID  3,104,668
TOBACCO PIPE AND STAND
Filed Nov. 14, 1962
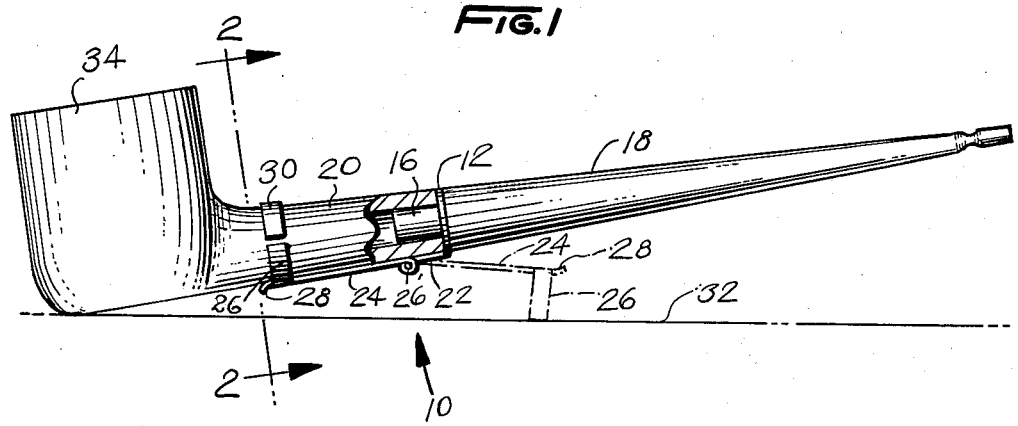
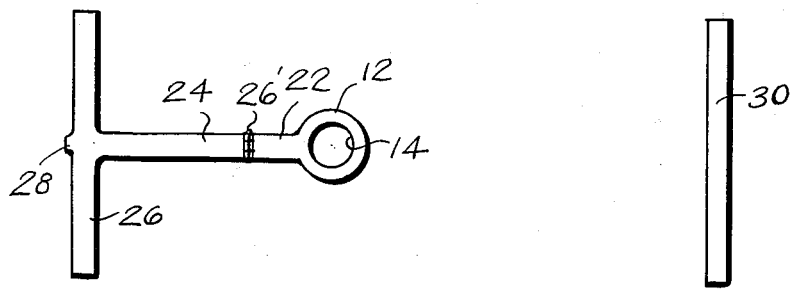
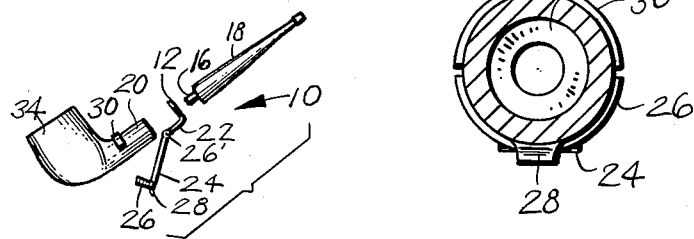
INVENTOR.
*Virgil A. Madrid*

United States Patent Office 3,104,668
Patented Sept. 24, 1963

3,104,668
TOBACCO PIPE AND STAND
Virgil A. Madrid, 2850 Maurepas St., New Orleans, La.
Filed Nov. 14, 1962, Ser. No. 237,568
1 Claim. (Cl. 131—186)

This invention relates to pipe stands and more particularly to a tobacco pipe and stand.

It is an object of the present invention to provide a pipe stand that will be secured to a pipe while remaining inconspicuous so as not to change the shape and lines of the pipe design and will be unobstructible, so that the pipe may be stored away as usual in a tobacco pouch or coat pocket.

Another object of the present invention is to provide a pipe stand that can be fitted snugly and held in place on a pipe by inserting it between the stem and the mouthpiece of the pipe.

Another object of the present invention is to provide a pipe stand which when not being used as a stand or when the device is flush with the pipe the lower part forming a semi-circular band half way around the bottom side of the pipe stem will not interfere with the storing and normal handling of the pipe and the upper half of the ring band is adhered to the pipe stem thus enhancing the decorative appearance of the pipe and will offer personalizing to the pipe by the initials of the owner being engraved upon it.

For other objects and for a better understanding of the invention reference may be had to the following detailed description taken in conjunction with the accompanying drawing, in which:

FIGURE 1 is a side view of a pipe and stand therefor comprising the present invention, a portion of the pipe being broken away and shown in section;

FIGURE 2 is a transverse view taken on the line 2—2 of FIGURE 1;

FIGURE 3 is a top plan view of the stand per se before bending to form;

FIGURE 4 is a top plan view of the split ring before being bent to form; and

FIGURE 5 is a partially exploded side view of the invention.

Referring now more in detail to the drawing, a tobacco pipe stand 10 made in accordance with the present invention is shown to include a flat circular ring 12 having a circular opening 14 which is freely received by stem extension 16 of stem 18. A pipe shank 20 abuts with one side of flat ring 12 while a large diameter end of pipe stem 18 abuts with the other side of flat ring 12 thus securing it to a smoking pipe. An extension arm 22 at right angles to flat ring 12 lies against the bottom of pipe shank 20 and is hingably connected to the elongated arm 24 by a pin 26' which provides pivot means for stand 10. Arm 24 terminates at its forward end by a semi-circular ring 26 which is provided with an arcuate lip 28 in alignment with arm 24 thus providing fingernail grip means for operating stand 10. A semi-circular ring 30 is adhered to pipe shank 20 in alignment with semi-circular ring providing decorative and initial engraving means for the pipe. Ring 26 is snappably engaged beneath the pipe shank 20 when not in use and when the device is in use the bottom end of ring 26 rests upon surface 32 while the pipe bowl 34 rests upon surface 32 and thus the two legs formed by ring 26 help to support the pipe.

In operation, the individual using stand 10 places a finger between the lip 28 and the pipe bowl 34 and disengages ring 26 from pipe shank 20 and rotates the arm 24 about the pin 26' until the open end of ring 26 faces downward and thus the individual places the pipe downward with the bowl 34 on the surface 32 and the ring 26 will thus support the stem 18 in an angular position thereby retaining the tobacco in the pipe bowl 34.

It shall thus be recognized that the pivoting of arm 24 is limited by the arm 22 being a stop.

It shall further be noted that a semi-circular ring 30 adhered to the upper portion of pipe shank 20 may be engraved with the owner's initials which will further provide decorativeness to the pipe.

While various changes may be made in the details of construction it shall be understood that such changes shall be within the spirit and scope of the present invention as defined by the appended claim.

What I claim as new and desire to protect by Letters Patent of the United States is:

A tobacco pipe and a stand therefor, said pipe including a vertically disposed tobacco receiving bowl having a straight, circular sectioned shank which is hollow and extending substantially perpendicularly from the lower portion thereof and terminating in a free end, having a substantially vertically disposed flat face, having a central opening therein leading to a smoke duct axially disposed in said shank, and a mouthpiece having an axial smoke duct therein and having a free end having a flat face adapted to confront the flat face on the free end of the shank and coincide therewith, said mouthpiece having a hollow, axial extension on the free end thereof adapted to be received in the shank duct with a friction fit and conduct smoke from the bowl to and through the mouthpiece, said stand comprising a flat circular ring member having an external diameter coinciding with that of the flat faces of the free ends of the shank and the mouthpiece, and having a central opening therethrough whereby said flat ring member may be placed on the exterior of said extension, between said flat faces and in contact therewith, said ring member having a lower portion having a first relatively flat arm extending from the periphery thereof along the adjacent portion of the exterior portion of the shank toward the bowl and terminating in a hinge, an elongated second arm carried by the hinge, colinear with said first arm and terminating in a semicircular ring substantially perpendicular having diametrically opposed free end portions adapted to frictionally engage opposite sides of the exterior of the shank when said second arm is pivoted so as to be adjacent said shank and wherein said opposed free end portions are also adapted to be positioned under a portion of said mouthpiece when said second arm is pivoted on said hinge so as to engage the first arm whereby said tobacco pipe may be supported on a flat surface by resting on a lower portion of the exterior of the bowl and on each of said diametrically opposed free end portions.

References Cited in the file of this patent
UNITED STATES PATENTS

| | | |
|---|---|---|
| 1,545,647 | Fargo | July 14, 1925 |
| 1,805,228 | Abbott | May 12, 1931 |
| 2,906,271 | Atkins | Sept. 29, 1959 |

FOREIGN PATENTS

| | | |
|---|---|---|
| 193,326 | Great Britain | Feb. 22, 1923 |
| 563,949 | Great Britain | Sept. 6, 1944 |